(12) United States Patent
Mark

(10) Patent No.: US 9,619,113 B2
(45) Date of Patent: Apr. 11, 2017

(54) OVERLOADING APP ICON TOUCHSCREEN INTERACTION TO PROVIDE ACTION ACCESSIBILITY

(71) Applicant: Quixey, Inc., Mountain View, CA (US)

(72) Inventor: Gilead Mark, San Francisco, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

(21) Appl. No.: 15/261,868

(22) Filed: Sep. 9, 2016

(65) Prior Publication Data

US 2017/0068406 A1 Mar. 9, 2017

Related U.S. Application Data

(60) Provisional application No. 62/216,360, filed on Sep. 9, 2015.

(51) Int. Cl.
| | |
|---|---|
| *G06F 3/0482* | (2013.01) |
| *G06F 3/0481* | (2013.01) |
| *G06F 3/0488* | (2013.01) |
| *H04L 29/06* | (2006.01) |
| *G06F 3/041* | (2006.01) |

(52) U.S. Cl.
CPC ........ *G06F 3/0482* (2013.01); *G06F 3/04817* (2013.01); *G06F 3/04883* (2013.01); *H04L 67/42* (2013.01); *G06F 3/0414* (2013.01)

(58) Field of Classification Search
CPC .................................................. G06F 3/0482
USPC .......................................................... 715/749
See application file for complete search history.

(56) References Cited

U.S. PATENT DOCUMENTS

| | | | | |
|---|---|---|---|---|
| 8,332,400 | B2 * | 12/2012 | Cooke ............... | G06F 17/30873 707/731 |
| 2007/0067734 | A1 * | 3/2007 | Cunningham ...... | G06F 3/04817 715/779 |
| 2010/0332996 | A1 * | 12/2010 | Sarkaria .................... | G06F 8/60 715/748 |
| 2011/0047491 | A1 * | 2/2011 | Hwang ................. | G06F 3/0488 715/765 |
| 2011/0265035 | A1 * | 10/2011 | Lepage ................. | G06F 3/0482 715/810 |
| 2012/0198547 | A1 * | 8/2012 | Fredette .................... | G06F 8/34 726/19 |
| 2014/0283142 | A1 * | 9/2014 | Shepherd .............. | G06F 3/0482 726/30 |

(Continued)

*Primary Examiner* — Reza Nabi
(74) *Attorney, Agent, or Firm* — Harness, Dickey & Pierce, P.L.C.

(57) ABSTRACT

A method of operating a user device includes, in response to a set of app icons being displayed, monitoring for user interaction with one of the app icons. In response to detecting user interaction with a first app icon corresponding to a first app, the method determines whether the detected user interaction satisfies first criteria or second criteria. In response to determining that the detected user interaction satisfies the first criteria, the method displays an action list corresponding to the first app. The action list includes a set of action items for user selection. A first item corresponds to a specific state of the first app. In response to the user selecting the first item, the method opens the first app to the specific state. In response to determining that the detected user interaction satisfies the second criteria, the method performs a default action for the first app.

16 Claims, 14 Drawing Sheets

(56) References Cited

U.S. PATENT DOCUMENTS

| | | | | |
|---|---|---|---|---|
| 2014/0310633 A1* | 10/2014 | McLellan | ........... | G06F 3/04842 |
| | | | | 715/771 |
| 2015/0040065 A1* | 2/2015 | Bianco | ................ | G06F 3/04883 |
| | | | | 715/810 |
| 2015/0082242 A1* | 3/2015 | Antipa | .................. | G06F 3/0482 |
| | | | | 715/811 |
| 2015/0205489 A1* | 7/2015 | Murphy | .................. | G06F 21/53 |
| | | | | 715/760 |
| 2015/0279313 A1* | 10/2015 | Yasuda | .................. | G09G 5/006 |
| | | | | 345/2.3 |
| 2015/0338998 A1* | 11/2015 | Chathoth | .............. | G06F 3/0425 |
| | | | | 345/175 |
| 2015/0347005 A1* | 12/2015 | Hou | .................... | G06F 3/04842 |
| | | | | 715/773 |
| 2016/0132342 A1* | 5/2016 | Yang | .................. | G06F 3/04883 |
| | | | | 715/708 |
| 2016/0259528 A1* | 9/2016 | Foss | ...................... | G06F 3/0482 |

\* cited by examiner

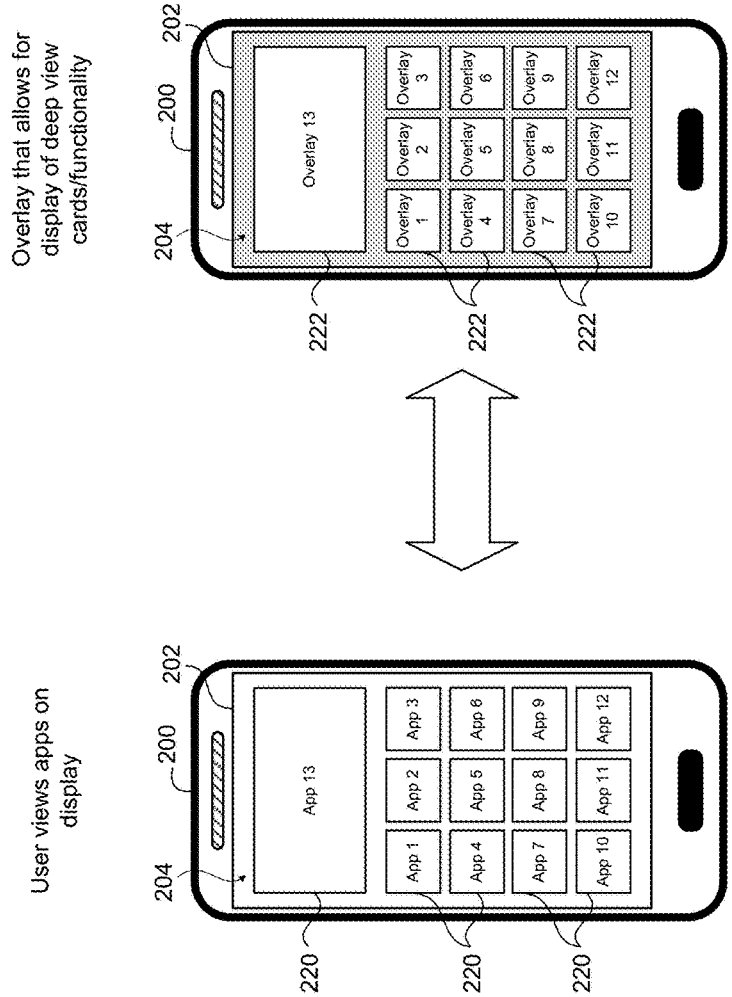

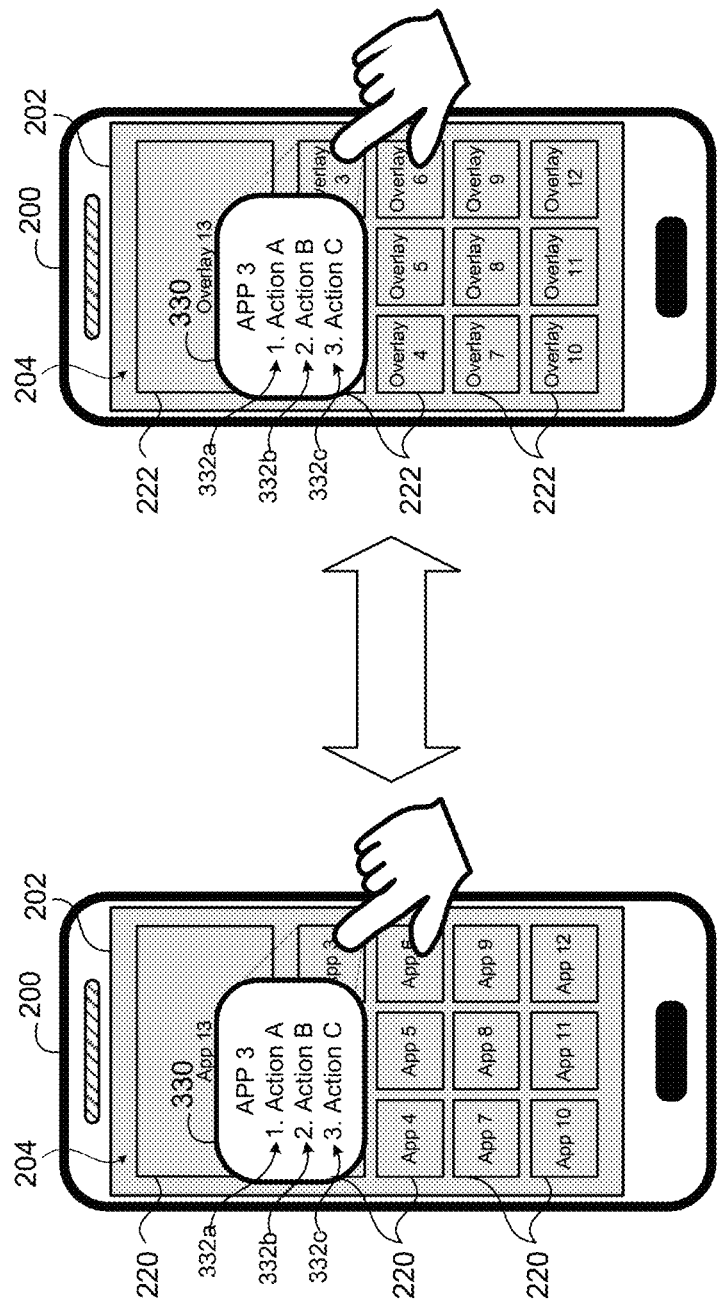

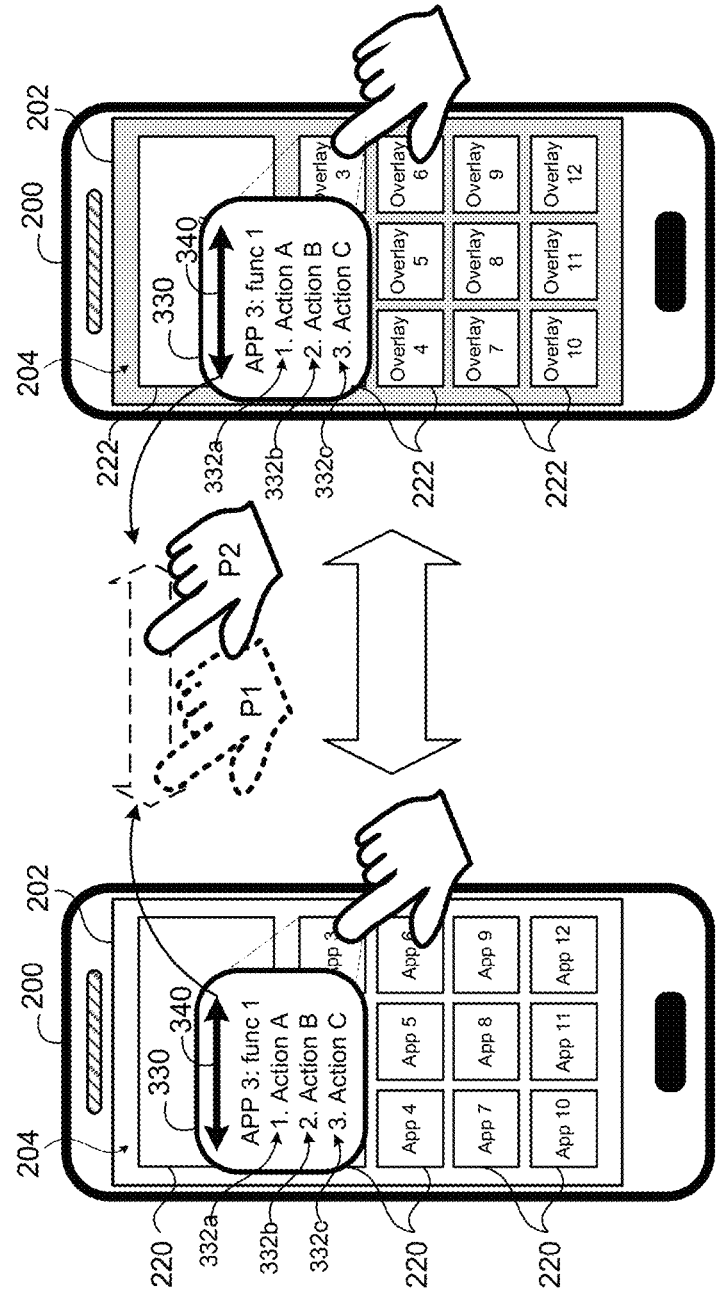

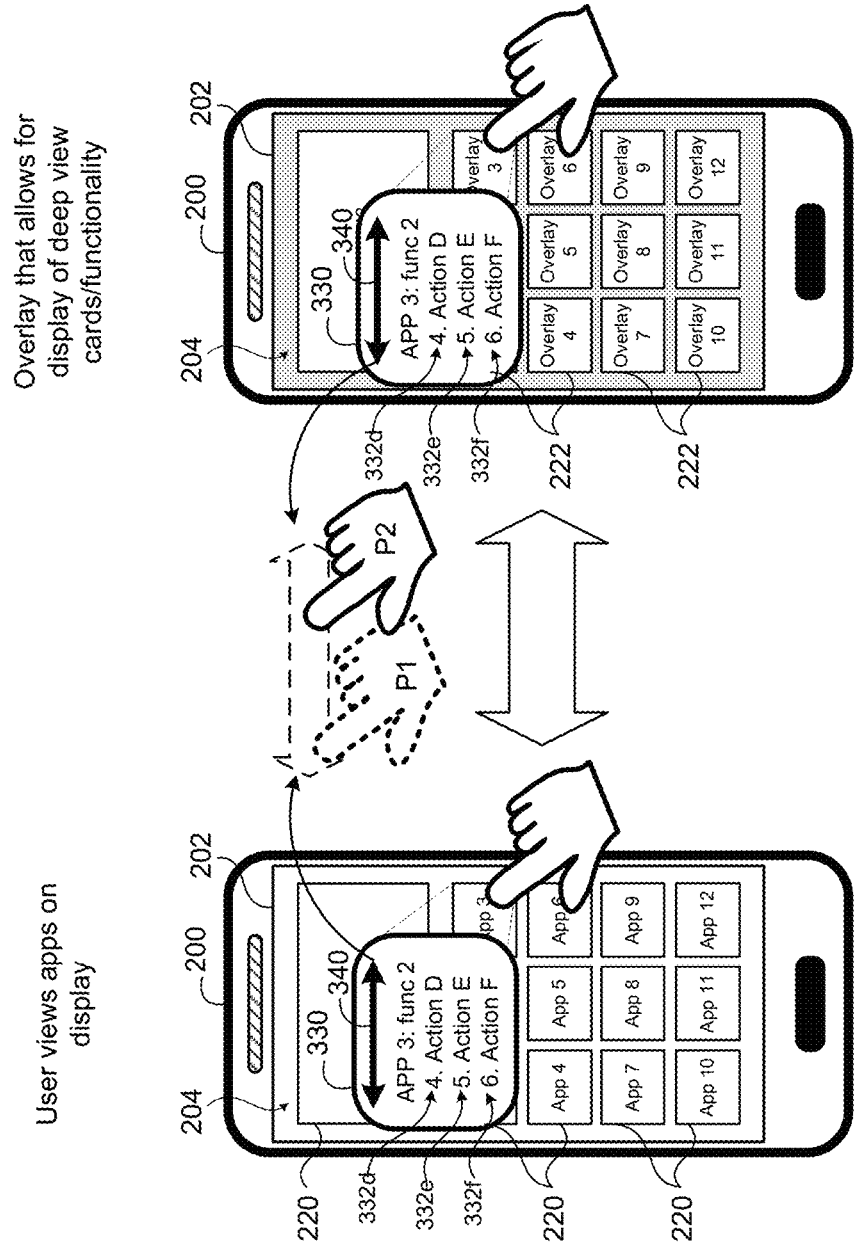

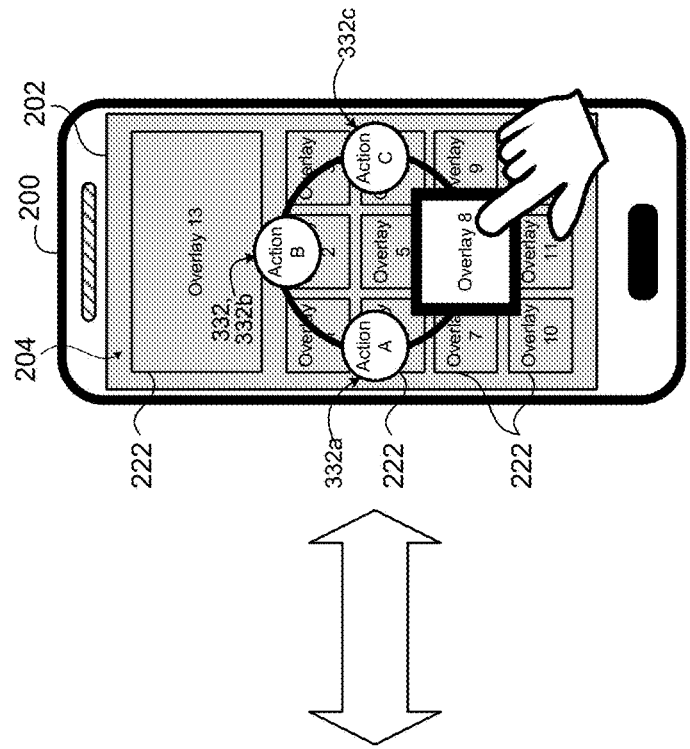
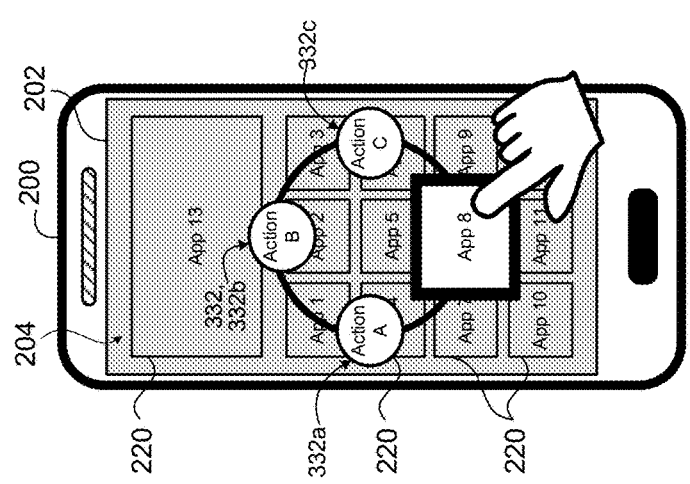
FIG. 6B
FIG. 6A

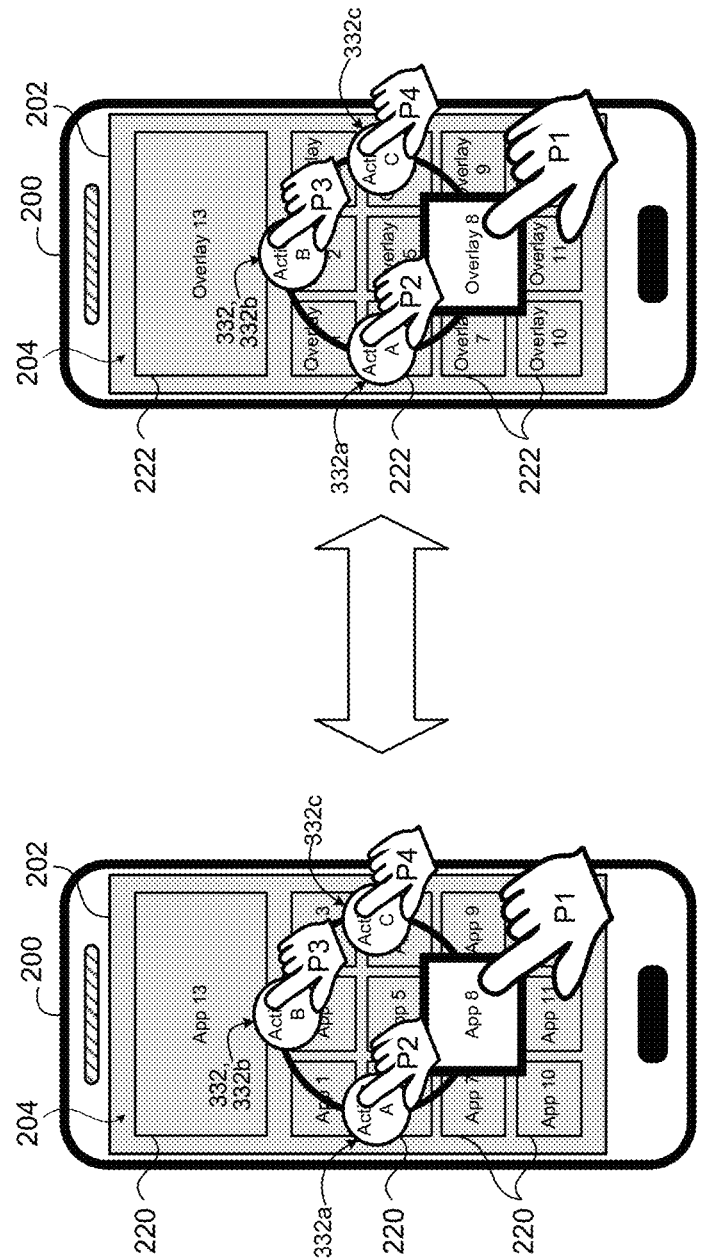

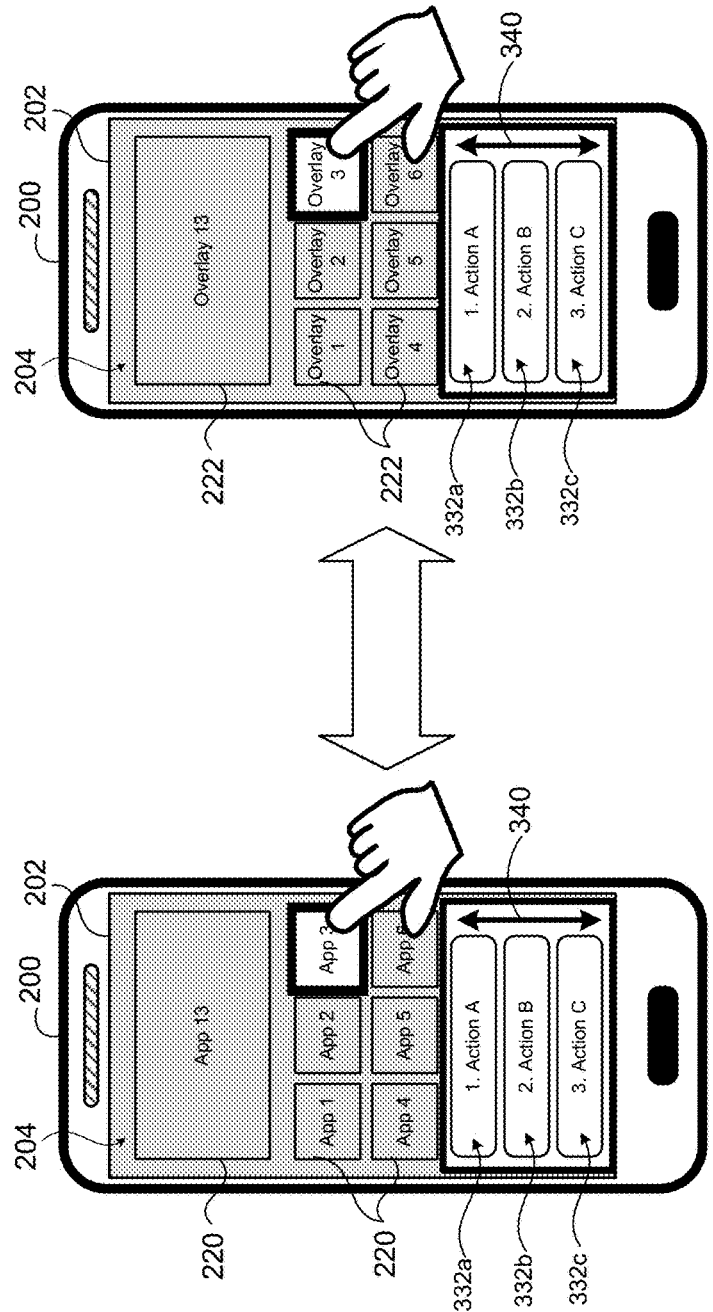

OVERLOADING APP ICON TOUCHSCREEN INTERACTION TO PROVIDE ACTION ACCESSIBILITY

CROSS-REFERENCE TO RELATED APPLICATIONS

This application claims the benefit of U.S. Provisional Application No. 62/216,360, filed Sep. 9, 2015. The entire disclosure of the application referenced above is incorporated by reference.

FIELD

This disclosure relates to mobile device software and more particularly to user interface interaction with application icons on touchscreen-enabled mobile devices.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Users may install apps, use them occasionally, and eventually delete them, without being aware of useful features they make available. Further, users may rely on specific features of apps that are not quickly accessible within the apps themselves.

SUMMARY

A method includes receiving, at data processing hardware, a first indication of a first user selection of a first application. The method includes associating, by the data processing hardware, the first indication with a quick-access menu includes user selectable links, each user selectable link associated with an action access mechanism having a reference to the first application and indicating a performable operation for the first application. The method includes displaying, by the data processing hardware, on a screen in communication with the data processing hardware the quick-access menu. The method includes receiving, at the data processing hardware, a second indication of a second user selection of a user selectable link. The method includes executing, by the data processing hardware, the action access mechanism associated with the selected user selectable link.

In other features, the method includes displaying, by the data processing hardware, on the screen a graphical user interface includes one or more application access mechanisms. Each application action mechanism has a reference to a corresponding application executable on the data processing hardware and indicating a performable operation of the corresponding application. The method includes receiving, at the data processing hardware, a third indication of a third user selection of an application access mechanism having a reference to the first application. The third indication is different than the first indication. The method includes executing, at the data processing hardware, the selected application access mechanism having the reference to the first application.

In other features, the first indication is a long selection including a user interaction with the screen for a first period of time greater than or equal to a selection time or a short selection including a user interaction with the screen for a second period of time less than the selection time. The third indication is the other one of the long selection or the short selection. Displaying the quick-access menu includes displaying a first threshold number of user selectable links and displaying a second threshold number of user selectable links when receiving a scroll indication.

In other features, displaying the quick-access menu includes displaying the user selectable links as icons overlaid on the display. Receiving the second indication includes receiving a swipe indication indicating a user interaction over the displayed overlaid icons and receiving a stop indication indicating cessation of the user interaction over or on a selected overlaid icon associated with the selected user selectable link. In other features, the method includes displaying the quick-access menu on a bottom portion or a top portion of the screen. In other features, the quick-access menu includes a scroll bar configured to move at least one of the user-selectable links into and out of a viewing area of the screen. In other features, displaying the quick-access menu includes displaying a pop-up menu adjacent to the selected application and displaying the user selectable links inside the pop-up menu.

A system includes data processing hardware and memory hardware in communication with the data processing hardware. The memory hardware stores instructions that, when executed on the data processing hardware, cause the data processing hardware to perform operations including receiving a first indication of a first user selection of a first application. The operations include associating the first indication with a quick-access menu includes user selectable links. Each user selectable link is associated with an action access mechanism having a reference to the first application and indicating a performable operation for the first application. The operations include displaying on a screen in communication with the data processing hardware the quick-access menu. The operations include receiving a second indication of a second user selection of a user selectable link. The operations include executing the action access mechanism associated with the selected user selectable link.

In other features, the operations include displaying on the screen a graphical user interface includes one or more application access mechanisms. Each application action mechanism has a reference to a corresponding application executable on the data processing hardware and indicating a performable operation of the corresponding application. The operations include receiving a third indication of a third user selection of an application access mechanism having a reference to the first application. The third indication is different than the first indication. The operations include executing the selected application access mechanism having the reference to the first application.

In other features, the first indication is one of a long selection including a user interaction with the screen for a first period of time greater than or equal to a selection time or a short selection including a user interaction with the screen for a second period of time less than the selection time. The third indication is the other one of the long selection or the short selection. In other features, displaying the quick-access menu includes displaying a first threshold number of user selectable links or displaying a second threshold number of user selectable links when receiving a scroll indication.

In other features, displaying the quick-access menu includes displaying the user selectable links as icons overlaid on the display. Receiving the second indication includes receiving a swipe indication indicating a user interaction over the displayed overlaid icons and receiving a stop indication indicating cessation of the user interaction over or on a selected overlaid icon associated with the selected user selectable link. In other features, the operations include displaying the quick-access menu on a bottom portion or a top portion of the screen. In other features, the quick-access menu includes a scroll bar configured to move at least one of the user-selectable links into and out of a viewing area of the screen. In other features, displaying the quick-access menu includes displaying a pop-up menu adjacent to the selected application and displaying the user selectable links inside the pop-up menu.

A method of operating a user device includes, in response to a set of app icons being displayed, monitoring for user interaction with one of the app icons. Each of the set of app icons corresponds to a different app installed on the user device. The method includes, in response to detecting user interaction with a first app icon corresponding to a first app, determining whether the detected user interaction satisfies first criteria or second criteria. The method includes, in response to determining that the detected user interaction satisfies the first criteria, preparing and displaying an action list corresponding to the first app. The action list includes a set of action items for user selection. A first item of the set of action items corresponds to a specific state of the first app. The method includes monitoring for user interaction with the action list and, in response to determining user selection of the first item, opening the first app to the specific state. The method includes, in response to determining that the detected user interaction satisfies the second criteria, performing a default action for the first app.

In other features, performing the default action for the first app includes launching the first app. In other features, the first criteria includes a length of a press on a touchscreen of the user device at a location corresponding to the first app icon exceeding a predetermined threshold. In other features, the first criteria is a force of a press on a touchscreen of the user device at a location corresponding to the first app icon exceeding a predetermined threshold. In other features, the method includes, (i) in response to detecting user interaction with the first app icon, determining whether the detected user interaction satisfies third criteria and (ii) in response to determining that the detected user interaction satisfies the second criteria, performing a deletion process for the first app.

In other features, the method includes downloading a default set of action items for the first app from a remote overlay server via a network connection. In other features, the method includes downloading default sets of action items for a plurality of apps including the first app. In other features, the plurality of apps includes apps corresponding to each of the set of displayed app icons. In other features, the method includes downloading an access mechanism for the specific state of the first app from a remote overlay server via a network connection.

In other features, the method includes tracking usage of the first app and generating the set of action items based on most frequently used states of the first app. In other features, opening the first app to the specific state includes at least one of invoking a view controller corresponding to the specific state, providing a uniform resource identifier to the first app that indicates the specific state, and replaying user interface events corresponding to the specific state.

A user device includes data processing hardware and memory hardware in communication with the data processing hardware. The memory hardware stores instructions that, when executed on the data processing hardware, cause the data processing hardware to perform operations including those described for the above methods.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

FIG. 3A is a schematic view of a user device displaying a graphical user interface as can be viewed by the user.

FIG. 3B is a schematic view of the user device of FIG. 3A showing an overlay over the graphical user interface.

FIG. 4A is a schematic view of a user device displaying a graphical user interface having an application menu as can be viewed by the user.

FIG. 4B is a schematic view of the user device of FIG. 4A showing an overlay over the graphical user interface.

FIG. 5A is a schematic view of a user device displaying a graphical user interface having an application menu as can be viewed by the user.

FIG. 5B is a schematic view of the user device of FIG. 5A showing an overlay over the graphical user interface.

FIG. 5C is a schematic view of a user device displaying a graphical user interface having an application menu as can be viewed by the user.

FIG. 5D is a schematic view of the user device of FIG. 5C showing an overlay over the graphical user interface.

FIG. 6A is a schematic view of a user device displaying a graphical user interface having an application menu as can be viewed by the user.

FIG. 6B is a schematic view of the user device of FIG. 6A showing an overlay over the graphical user interface.

FIG. 6C is a schematic view of a user device displaying a graphical user interface having an application menu as can be viewed by the user.

FIG. 6D is a schematic view of the user device of FIG. 6C showing an overlay over the graphical user interface.

FIG. 7A is a schematic view of a user device displaying a graphical user interface having an application menu as can be viewed by the user.

FIG. 7B is a schematic view of the user device of FIG. 7A showing an overlay over the graphical user interface.

DETAILED DESCRIPTION

A system of the present disclosure implements an overlay system on a user device or remotely, allowing the user to access one or more application functionalities from a home screen that displays the application icons, without having to launching the application. In other words, the overlay system provides the user with a shortcut menu to application functionalities associated with the corresponding application, where each functionality is associated with a user-selectable link. For example, a user may select an application that includes navigation functionalities. In this case, the overlay system displays on a graphical user interface (GUI) of a display of the user device, a quick-access menu with at least one option allowing the user to access navigation functionalities without having actually launched the app. Some of the functionalities may include, but are not limited to, "Home" that provides a map and directions to the user's house without the user entering his home address, or "Work" that also provides a map and directions to the user's work, or "Estimated Time to Home" that provides an estimated time of arrival from the user's current location to his home. Other examples are possible as well.

Overview

Figure 1:
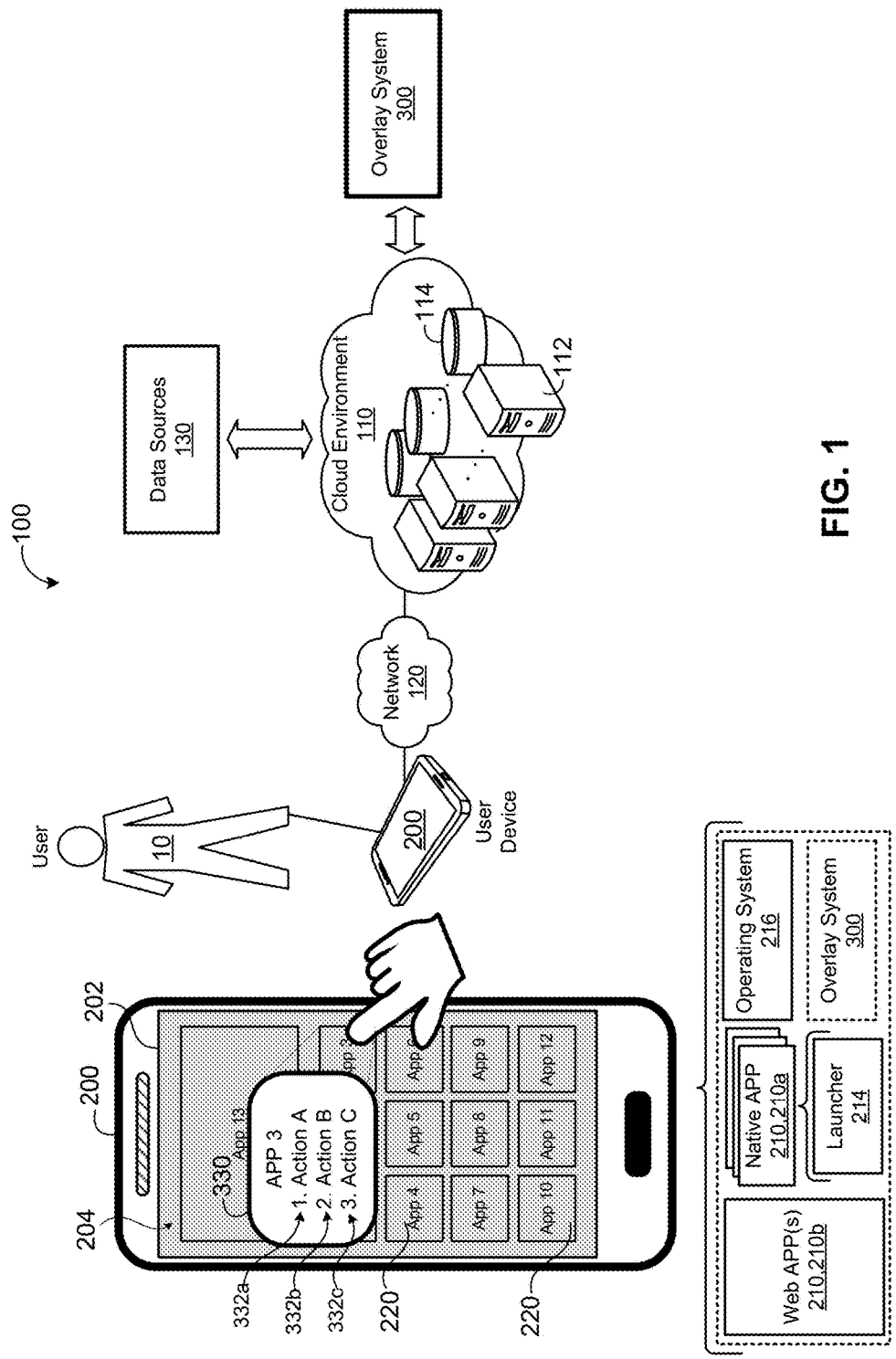
FIG. 1 is a schematic view of an example environment including a user device in communication with an overlay system.
Figure 2:
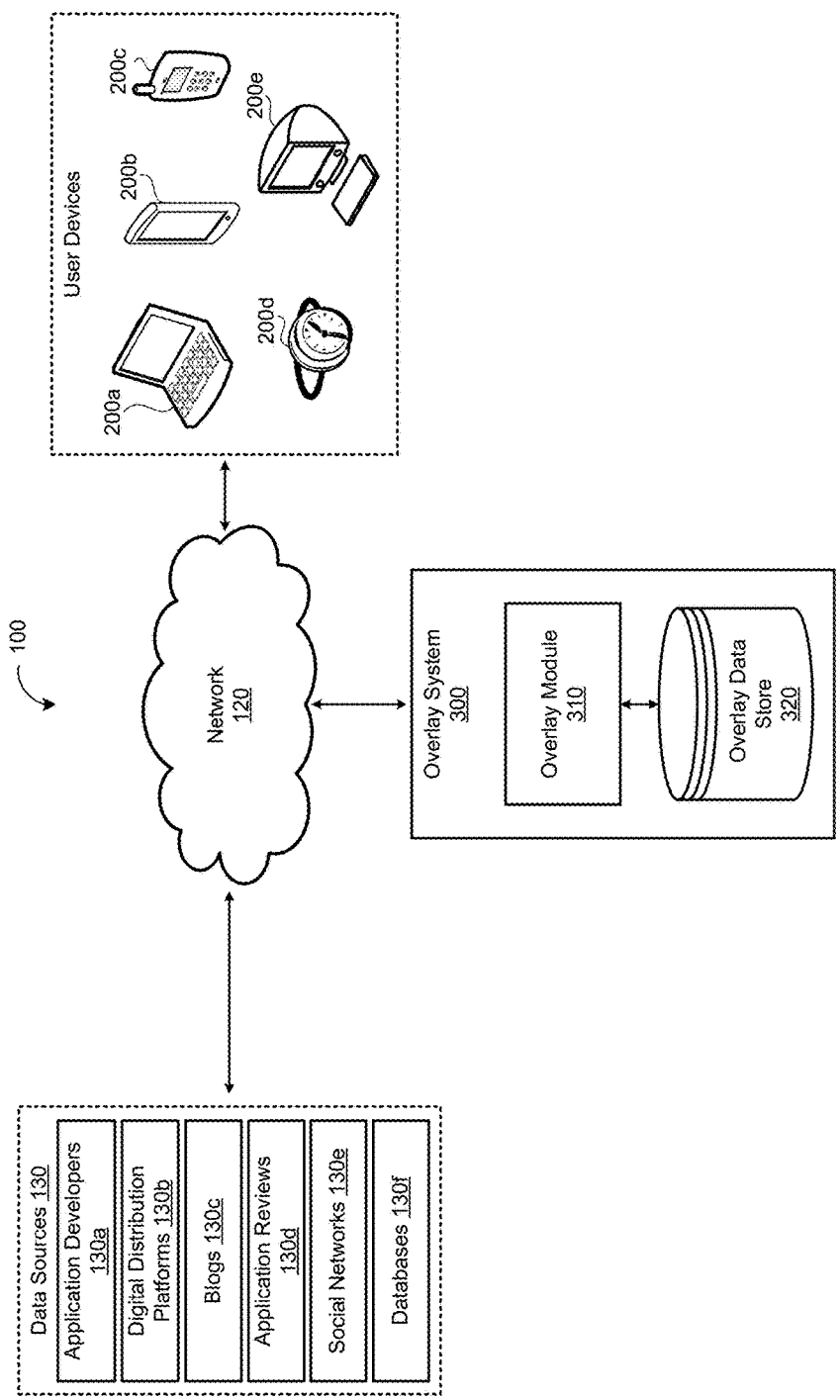
FIG. 2 is a functional block diagram of a system having an overlay system that interacts with the user device and data sources.

Referring to FIGS. 1 and 2, in some implementations, an example system 100 includes a user device 200 associated with a user 10 in communication with a remote system 110 via a network 120. The remote system 110 may be a distributed system (e.g., cloud environment) having scalable/elastic computing resources 112 and/or storage resources 114. The user device 200 and/or the remote system 110 may implement an overlay system 300 that optionally receives data from one or more data sources 130 or one or more other user devices 200. In some implementations, the overlay system 300 communicates with the one or more user devices 200 and the data sources(s) 130 via the network 120. The network 120 may include various types of networks 120, such as a local area network (LAN), wide area network (WAN), and/or the Internet. As shown and as will be discussed, the overlay system 300 is separate from the user device 200. However, in some implementations, the overlay system 300 (e.g., an overlay data processing hardware of the overlay system 300) executes on the user device 200 (e.g., a device data processing hardware of the user device 200), as will be shown in FIG. 8.

In some implementations, when a user 10 wants to execute a function of an application 210, the user 10 selects an icon 220 displayed on the display 202 of the user device 200 by way of the GUI 204. Usually, the user 10 desires a specific function to be executed by the application 210 associated with the selected application icon 220. For example, if the user 10 wants to navigate to a specific location, the user 10 selects an application icon 220 associated with a navigation application 210. The navigation application 210 would then execute allowing the user to enter the address he/she wants to navigate to. It is desirable to implement a system 100 that saves the user 10 one or more steps before reaching the desired functionality (e.g., navigating to a specific destination).

The system 100, more specifically, the overlay system 300 associates a quick-access menu 330 with one or more application icons 220 displayed on the display 202 of the user device 200, by overlaying an interface over the displayed application icons 220 which allows the user 10 to access the quick-access menu 330. As shown, a user 10 selects an application icon 220 (e.g., APP3) associated with an application 210 executable on the user device 200. Upon selection, the GUI 204 displays the quick-access menu 330 including menu items 332, where each menu item 332 is associated with a user-selectable link that executes a functionality or action of the selected application 210 (e.g., APP 3).

Menu items may also contain dynamic information that can be retrieved by the quick-access menu. For example, if each menu item represents a different type of UBER ride sharing service (X, Black, XL, etc.), each menu item may display the dynamically-retrieved wait time for that type of vehicle to arrive at the user location. For example, one or more menu items may be a deep view card (DVC).

A DVC for an app state shows additional information beyond just the identification of the app or app state. For example, the information may include a title of the app state or a description of the app state, which may be a snippet of text from the app state. Other metadata may be provided from the app state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping app to get navigation directions to the establishment.

Other interactions with the DVC (such as tapping or clicking any other area of the DVC) may take the user to the indicated state or app. As described in more detail below, this may be accomplished by opening the relevant app or, if the app is not installed, opening a website related to the desired app state. In other implementations, an app that is not installed may be downloaded, installed, and then executed in order to reach the desired app state.

In other words, a DVC includes identifying information for the app or state as well as additional content from the app or state itself. The additional content allows the user to make a more informed choice about which result to choose, and may even allow the user to directly perform an action without having to navigate to the app state. If the action the user wants to take is to obtain information, in some circumstances the DVC itself may provide the necessary information to accomplish such action.

As shown, the quick-access menu 330 includes three actions 332a, 332b, 332c. The user device 200 may be any computing device capable of displaying on a display 202 one or more quick-access menus 330 where each quick-access menu 330 includes menu items 332 associated with a selected application icon 220 of an application 210 executable on the user device 200. In addition, the user device 200 is capable of executing the one or more installed applications 210. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems 216. In examples where a user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 216 running on the user device 200 may include, but is not limited to, one of ANDROID®, IOS®, or WINDOWS PHONE®. In an example where a user device 200 is a laptop or desktop computing device, the user device 200 may run an operating system including, but not limited to, MICROSOFT WINDOWS® by Microsoft Corporation, MAC OS® by Apple, Inc., or Linux. User devices 200 may also access the overlay system 300 while running operating systems 216 other than those operating systems 216 described above, whether presently available or developed in the future.

A software application 210 may refer to computer software that, when executed by a computing device, causes the computing device to perform a task. In some examples, a software application 210 may be referred to as an "application", an "app", or a "program". Example software applications 210 include, but are not limited to, word processing applications, spreadsheet applications, messaging applications, media streaming applications, social networking applications, and games.

Applications 210 may be executed on a variety of different user devices 200. In some examples, a native application 210a may be installed on a user device 200 prior to a user 10 purchasing the user device 200. In other examples, the user 10 may download and install native applications 210a on the user device 200.

The functionality of an application 210 may be accessed on the computing device 200 on which the application 210 is installed. Additionally or alternatively, the functionality of an application 210 may be accessed via a remote computing device 112. In some examples, all of an application's functionality is included on the computing device 200 on which the application 210 is installed. These applications 210 may function without communication with other computing devices 200 (e.g., via the Internet). In other examples, an application 210 installed on a computing device 200 may access information from other remote computing devices 112 during operation. For example, a weather application installed on a computing device 200 may access the latest weather information via the Internet and display the accessed weather information to the user 10 through the installed weather application. In still other examples, a web-based application 210b (also referred to herein as a web application) may be partially executed by the user's computing device 200 and partially executed by a remote computing device 112. For example, a web application 210b may be an application 210 that is executed, at least in part, by a web server and accessed by a web browser (e.g., a native application 210a) of the user's computing device 200. Example web applications 210b may include, but are not limited to, web-based email, online auctions, and online retail sites. In some examples, one or more applications 210 provides a quick-access menus 330 allowing the user 10 to access one or more quick-access menu items 332, where each quick-access menu items 332 is associated with an action or functionality of the application 210.

In general, the user device 200 may communicate with the overlay system 300 using any software application 210, such as an overlay launcher 214, which overlays an overlay over the displayed application icons 220. The overlay (as shown in FIG. 3B) is configured to identify a user input, such as a selection of an application icon 220 associated with an application 210 and perform an action based on the received input. For example, a short selection of an application icon 220 may be defined as the user's interaction with the screen 202 for a period of time less than a selection time (e.g., 1200 milliseconds).

The short selection may trigger the execution of the application access mechanism associated with the application 210 of the selected icon 220. However, a long selection defined as the user's interaction with the screen 202 for a period of time greater or equal than the selection time, results in the overlay system 300 displaying the quick access menu 330.

In other implementations, a touchscreen may register the force of a user's touchscreen press. A more forceful press may result in the quick access menu 330 while a less forceful press may result in launching the app.

Therefore, the overlay system 300 uses the overlay (FIG. 3B) to determine an action, such as executing the selected application or displaying the quick-access menu 330 associated with the selected application 210. In other words, the overlay, which is not visible to the user 10, allows the display of the quick access menu 330.

The overlay launcher 214 may be an application user interface program that is installed on the user device 200 that replaces a native home screen with a more customizable interface allowing the GUI 204 to display the quick-access menu 330 upon a user's selection of an application icon 220. The overlay launcher 214 allows the user 10 or the user device 200 (e.g., the overlay system 300), to personalize a home screen (or any other screen of the GUI 204 of the user device 200. In some implementations, the overlay launcher 214 also manages a home screen, wallpaper(s), a launch bar, an application installation, shortcuts, and widgets.

In some examples, the user device 200 executes the overlay launcher 214 that is dedicated to interfacing with the overlay system 300 (executing on the user device or remotely). The user device 200 may communicate with the overlay system 300 using a more general application 210, such as a web-browser application 210b accessed using a web browser native application 210a. Although the user device 200 may communicate with the overlay system 300 using the overlay launcher 214 and/or a web-browser application 210b, the user device 200 may be described hereinafter as using the overlay launcher 214 to communicate with the overlay system 300. In some implementations, the functionality attributed to the overlay launcher 214 is included as an overlay component of a larger application 210 that has additional functionality. For example, the functionality attributed to the overlay launcher 214 may be included as part of a native application 210a or a web application 210b as a feature that provides quick-access menus 330 associated with application icon 220 displayed on the display 202 by way of the GUI 204.

In some implementations, as shown in FIG. 2, the overlay system 300 includes an overlay module 310 in communication with an overlay data store 320. The overlay system 300 receives usage data associated with a user 10. The overlay module 310 analyzes the received data and stores the analyzed data in the overlay data store 320. The usage data includes data relating to the interactions of the user 10 with one or more applications 210 installed on the user device 200. In some examples, the overlay system 300 receives usage data of multiple users 10. Usage data may include, but is not limited to, a user's interaction with an application 210, a time/date that a user 10 opens an application 210, duration of using an application 210, a time/date of closing the application 210, frequency of using the application 210, or any other relevant data indicative of the user's interaction with the application 210 via the GUI 204. The overlay module 310 uses usage data associated with a user 10 to determine the quick-access menu items 332 associated with a selected application icon 220 of an application 210. For example, the quick-access menu items 332 may include items being the most user-selectable links associated with the applications. For example, if a user 10 has a habit of using specific navigation/traffic application to go to his house, then the quick-access menu 330 includes a first quick-access menu item 332 that allows the user 10 to select the first quick-access menu item 332 associated with an access mechanism that executes the navigation/traffic application and provides the user 10 with directions and traffic information to his house. Therefore, the first quick-access menu item 332 allows the user 10 to by-pass selecting the application 210 then entering a destination; instead, the user 10 selects the first quick-access menu item 332 that directly executes the navigation/traffic application 210. In some implementations, the user 10 may set the quick-access menu items 332 to application states associated with application access mechanisms of the applications. Therefore, the quick-access menu 330 may be customized by the user 10 to include application states most useful to the user 10.

The data sources 130 may include a variety of different data providers. The data sources 130 may include data from application developers 130a, such as application developers' websites and data feeds provided by developers. The data sources 130 may include operators of digital distribution platforms 130b configured to distribute native applications 210a to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130c (i.e., blogs), application review websites 130d, or other websites including data related to applications 210. Additionally, the data sources 130 may include social networking sites 130e, such as "FACEBOOK®" by Facebook, Inc. (e.g., Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

Interface Examples

FIG. 3A shows a user device 200 having a display 202 displaying a GUI 204 that includes application icons 220, where each application icon 220 is associated with an application 210. The application icons 220 may have different size. For example, application icons 220 of APP1-APP12 are smaller than application icon 220 for APP13. For one or more application icons 220, the overlay system 300 displays an overlay 222. For example, the first application icon 220 for APP1 has a corresponding overlay 222 OVERLAY1, a second application icon 220 for APP2 has a corresponding overlay 222 OVERLAY2, . . . . As previously discussed, the overlay 222 associated with each application icon 220 determines a selection method of the application icon 220 and determines if the selection method results in an execution of the associated application or the display of the quick-access menu 330. When a user 10 views the display 202 displaying the GUI 204, the user 10 only sees the application icons 220 as shown in FIG. 3A. The user 10 does not see the overlay 222 associated with the application icons 220. However, in some examples, the GUI 204 may display an indication informing the user 10 that he/she has the option to view the quick-access menu 330 by performing a user selection/action.

Referring to FIGS. 4A and 4B, in some implementations, when a user 10 selects an application icon 220, for example, APP3, the overlay module 310 displays by way of the GUI 204, the quick-access menu 330 associated with the application 210 (e.g., APP3). FIG. 4A shows the user 10 making a selection of the APP3 application icon 220, while FIG. 4B shows the overlay system 300 associating the user selection of the APP3 application icon 220 with OVERLAY3 overlay 222 that determines the type of selection of the user (e.g., long press or short press) and determines the action to take based on the user selection. As shown, the overlay system 300 identified the user selection as a selection triggering the display of the quick-access menu 330. As shown, the quick-access menu 330 includes three quick-access menu items 332a, 332b, 332c.

FIGS. 5A-5D are similar to FIGS. 4A and 4B. FIGS. 5A and 5C display the GUI 204 as seen by the user 10, while FIGS. 5B and 5D show the overlay 222 associated with the icons 220. The quick-access menu 330 includes an arrow 340 that allows the user to navigate between a first page of quick-access menu item 332a, 332b, 332c (FIGS. 5A and 5B) and a second page of quick-access menu item 332d, 332e, 332f (FIGS. 5C and 5D). In various implementations, avoiding multiple pages of quick-access items may be a priority. With too many options, the user may not perceive the quick-access menu as being any quicker or easier to use than the app itself.

In some implementations, the first page of quick-access menu 330 (FIGS. 5A and 5B) includes quick-access menu item 332a, 332b, 332c associated with a first function of the selected application 210, while the second page of quick-access menu (FIGS. 5C and 5D) includes quick-access menu item 332d, 332e, 332f associated with a second function of the selected application 210.

For example, an application "REVIEW/RESERVATION APP" provides restaurant reviews and allows a user to make reservation at restaurants. In this case, the first function of the application may be the reservation function where the quick-access menu items 332 include action application access mechanisms associated with making reservations, for example, each action associated with a specific restaurant. Moreover, the second function of the application may be the review function where the quick-access menu items 332 include action application access mechanisms associated reviewing a restaurant, for example, each action associated with a specific restaurant.

FIGS. 6A-6D show a quick-access menu 330 that includes the quick-access menu items 332 in a way that allows the user 10 to make a selection of one of the quick-access menu items 332 without removing his/her finger from the display 202. In this case, the user 10 selects APP8 application icon 220. The overlay system 300 displays the quick-access menu 330 as a circular menu allowing the user 10 to make a circular motion as shown in FIGS. 6B and 6C. More specifically, the user 10 moves his/her finger from position P1 on the selected application icon 220 (APP8) to P2, P3, P4 and back to P1. To make a selection of any one of the quick-access menu items 332, the user 10 stops at the position of the associated quick-access menu items 332. To select action A, the user 10 stops at position P2.

FIGS. 7A and 7B show another method of displaying the quick-access menu 330. As shown, upon a user selection of an application icon 220 that triggers the display of the quick-access menu 330, the quick-access menu items 332 are shown at the bottom of the display 202. In this case, the quick-access menu items 332 are shown as a list that the user 10 may scroll through using a scrolling arrow 340. As shown, the quick-access menu 330 is positioned at the bottom of the display 202, but the quick-access menu 330 may be positions in any other location configured to display the quick-access menu 330 as a list and allow the user 10 to scroll through the quick-access menu 330.

Access mechanisms may include at least one of a native application access mechanism (hereinafter "application access mechanism"), a web access mechanism, and an application download mechanism. The user device 200 may use the access mechanisms to access functionality of applications 210. For example, the user 10 may select an application icon 220 associated with an application access mechanism or an quick-access menu item 332 associated with an action access mechanism.

An application access mechanism may be a string that includes a reference to a native application and indicates one or more operations for the user device 200 to perform. If the user 10 selects a user selectable link 332 including an action access mechanism, the user device 200 may launch the native application 210 referenced in the application access mechanism and perform the one or more operations indicated in the application access mechanism. If the user 10 selects an application icon 220 including an application access mechanism, the user device 200 may launch the native application 210 referenced in the application access mechanism and perform the one or more operations indicated in the application access mechanism.

An application access mechanism includes data that the user device 200 can use to access functionality provided by a native application. For example, an application access mechanism can include data that causes the user device 200 to launch a native application and perform a function associated with the native application. Performance of a function according to the access mechanism may set the native application into a specified state. Accordingly, the process of launching a native application and performing a function according to an application access mechanism may be referred to herein as launching the native application and setting the native application into a state that is specified by the application access mechanism. In some examples, an application access mechanism for a restaurant reservation application can include data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism for an internet media player application can include data that causes the user device 200 to launch the internet media player application and stream media from the Internet. In such examples, the internet media player application may be set in a state that displays information regarding the media (e.g., music) being streamed, such as a song name, an artist, or an album name.

Application access mechanisms may have various different formats and content. The format and content of an application access mechanism may depend on the native application 210 with which the application access mechanism is associated and the operations that are to be performed by the native application 210 in response to selection of the application access mechanism. For example, an application access mechanism for an internet music player application may differ from an application access mechanism for a shopping application. An application access mechanism for an internet music player application may include references to musical artists, songs, and albums, for example. The application access mechanism for an internet music player application may also reference operations, such as randomizing a list of songs and playing a song or album. An application access mechanism for a shopping application may include references to different products that are for sale. The application access mechanism for the shopping application may also include references to one or more operations, such as adding products to a shopping cart and proceeding to a checkout.

Block Diagram

Figure 8:
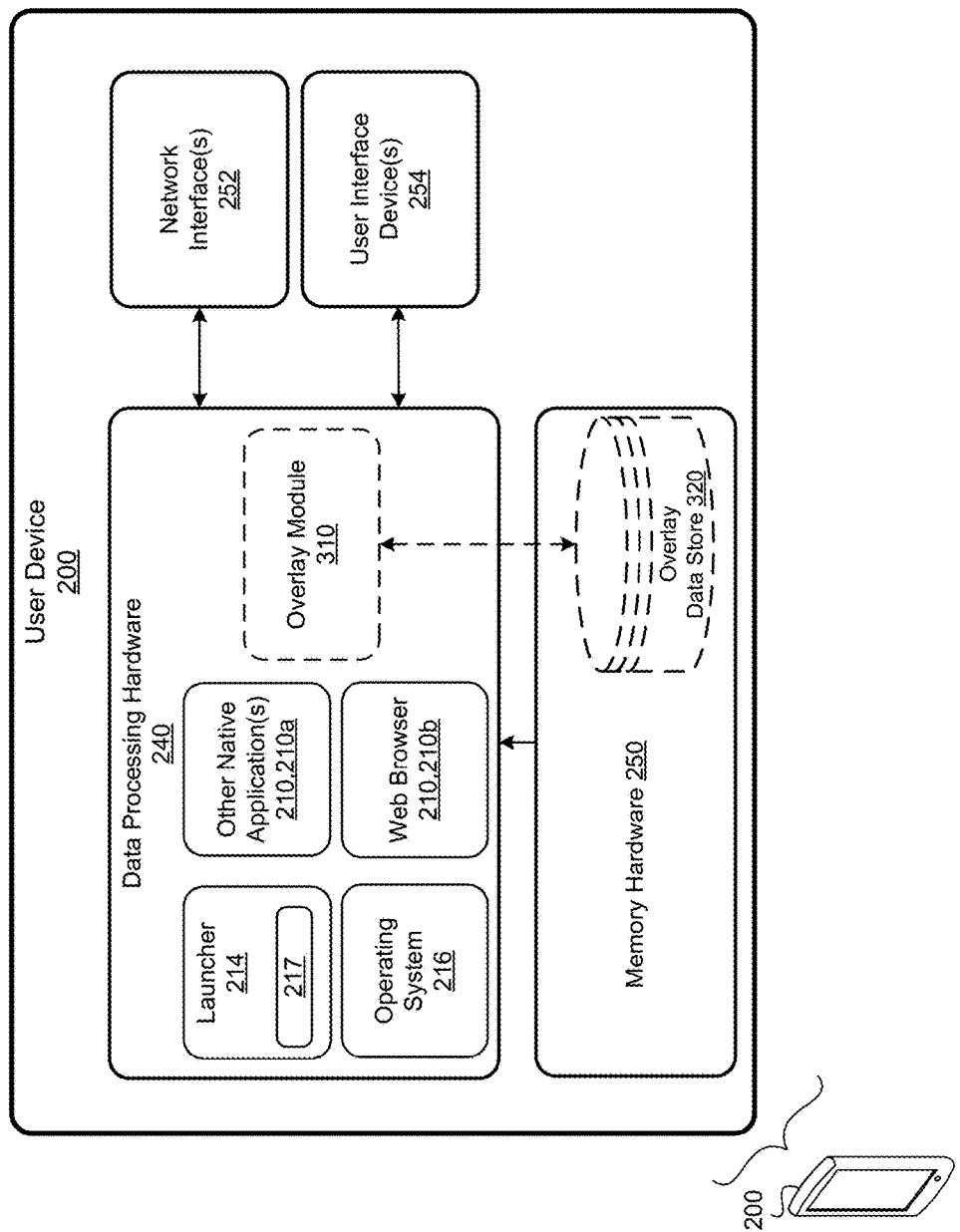
FIG. 8 is a schematic view of an example user device.

FIG. 8 illustrates example components of a user device 200. In the illustrated example, the user device 200 includes a data processing hardware 240, a storage device/hardware 250, a network interface device 252, and a user interface device 254. The user device 200 may include other components not explicitly depicted.

The processing device 240 includes memory (e.g., RAM and/or ROM) that stores computer readable instructions and one or more processors that execute the computer readable instructions. In implementations where the processing device 240 includes two or more processors, the processors can execute in a distributed or individual manner. The processing device 240 may execute a native application 210a that includes a native application module, any number of other native applications 210a, a web browser 210b, and an operating system 216, all of which may be embodied as computer readable instructions. The operating system 216 acts as an interface between the processing device 240 and the applications 210.

The processing device 240 executes the overlay launcher 214 configured with a launcher module 217. The launcher module 217 is a set of computer readable instructions embedded (e.g., by the developer) in the native application 210a, i.e., overlay launcher 214. In some implementations, the developers use a software developer kit (SDK) provided by the provider of the overlay system 300 to implement the launcher module 217. The developers may also use third party SDKs to implement part or all of the launcher module 217.

In some examples, the processing device 240 includes the overlay module 310 and the storage device 250 includes the overlay data store 320. In other examples, the processing device 240 includes the overlay module 310, which is in communication with the overlay data store 320 that is located remotely from the user device 200.

The storage device 250 includes one or more computer readable mediums (e.g., hard disk drive and/or flash memory). The storage device 250 can store the computer readable instructions that make up the native applications 210a, the web browser 210b, and the operating system 216. The network interface 252 includes one or more devices that are configured to communicate with the network. The network interface 252 can include one or more transceivers for performing wired or wireless communication. Examples of the network interface 252 may include, but are not limited to, a transceiver configured to perform communications using the IEEE 802.11 wireless standard, an Ethernet port, a wireless transmitter, and a universal serial bus (USB) port.

The user interface 254 includes one or more devices that receive input from and/or provide output to a user 10. The user interface 254 can include, but is not limited to, a touchscreen, a display, a QWERTY keyboard, a numeric keypad, a touchpad, a microphone, and/or speakers.

Flowcharts

Figure 9:
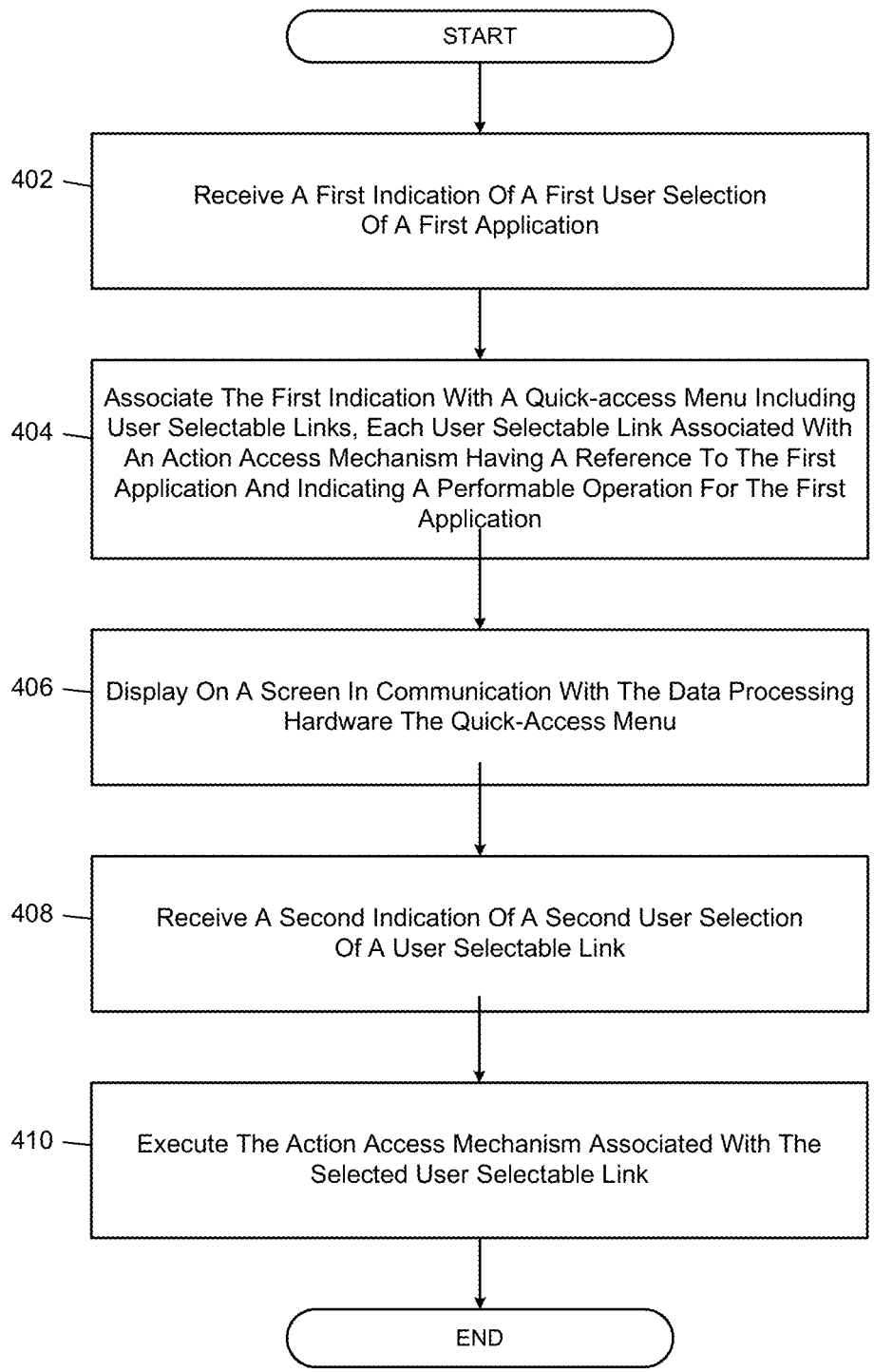
FIG. 9 is an example arrangement of operations for a method of displaying a quick-access menu in response to receiving an indication of a user selection of an application.

FIG. 9 provides an example arrangement of operations for a method of displaying a quick-access menu 330 in response to receiving an indication of a user selection of an application icon 220 displayed on a display 202 of a user device 200. The method is described with respect to the user device 200 and the overlay system 300 as illustrated in FIGS. 1-8.

At block 402, the method includes receiving, at data processing hardware (of a user device 240 or at the overlay module 310), a first indication of a first user selection of a first application 210. At block 404, the method includes associating, the first indication with a quick-access menu 330. The quick-access menu 330 includes user selectable links 332 (e.g., quick-access menu items 332). Each user selectable link 332 is associated with an action access mechanism having a reference to the first application and indicating a performable operation for the first application. A block 406, the method includes displaying on a screen 202 in communication with the data processing hardware the quick-access menu 330. At block 408, the method includes receiving a second indication of a second user selection of a user selectable link 332. At block 410, the method includes executing the action access mechanism associated with the selected user selectable link 332.

In some examples, the method also includes displaying on the screen 202 a GUI 204 comprising one or more application access mechanisms. Each application action mechanism having a reference to a corresponding application executable on the data processing hardware and indicating a performable operation of the corresponding application. The method may also include receiving a third indication of a third user selection of an application access mechanism having a reference to the first application, the third indication being different than the first indication and executing the selected application access mechanism having the reference to the first application. Additionally, the first indication may include one of a long selection or a short selection. The long selection includes a user interaction with the screen for a first period of time greater than or equal to a selection time, while the short selection includes a user interaction with the screen for a second period of time less than the selection time. In this case, the third indication includes the other one of the long selection or the short selection.

In some examples, displaying the quick-access menu further includes displaying a first threshold number of user selectable links, or displaying a second threshold number of user selectable links when receiving a scroll indication. In some implementations, displaying the quick-access menu further includes displaying the user selectable links as icons overlaid on the display, and receiving the second indication includes receiving a swipe indication indicating a user interaction over the displayed overlaid icons, and receiving a stop indication indicating cessation of the user interaction over or on a selected overlaid icon associated with the selected user selectable link.

In some examples, the method may further include displaying the quick-access menu on a bottom portion or a top portion of the screen 202. In some implementations, displaying the quick-access menu further includes displaying a pop-up menu adjacent to the selected application, and displaying the user selectable links inside the pop-up menu. In other implementations, the quick-access menu includes a scroll bar configured to move at least one of the user-selectable links into and out of a viewing area of the screen. However, eliminating the need for the scroll bar may be a design priority so that selection of a relevant quick action is not made slower or less convenient.

Figure 10:
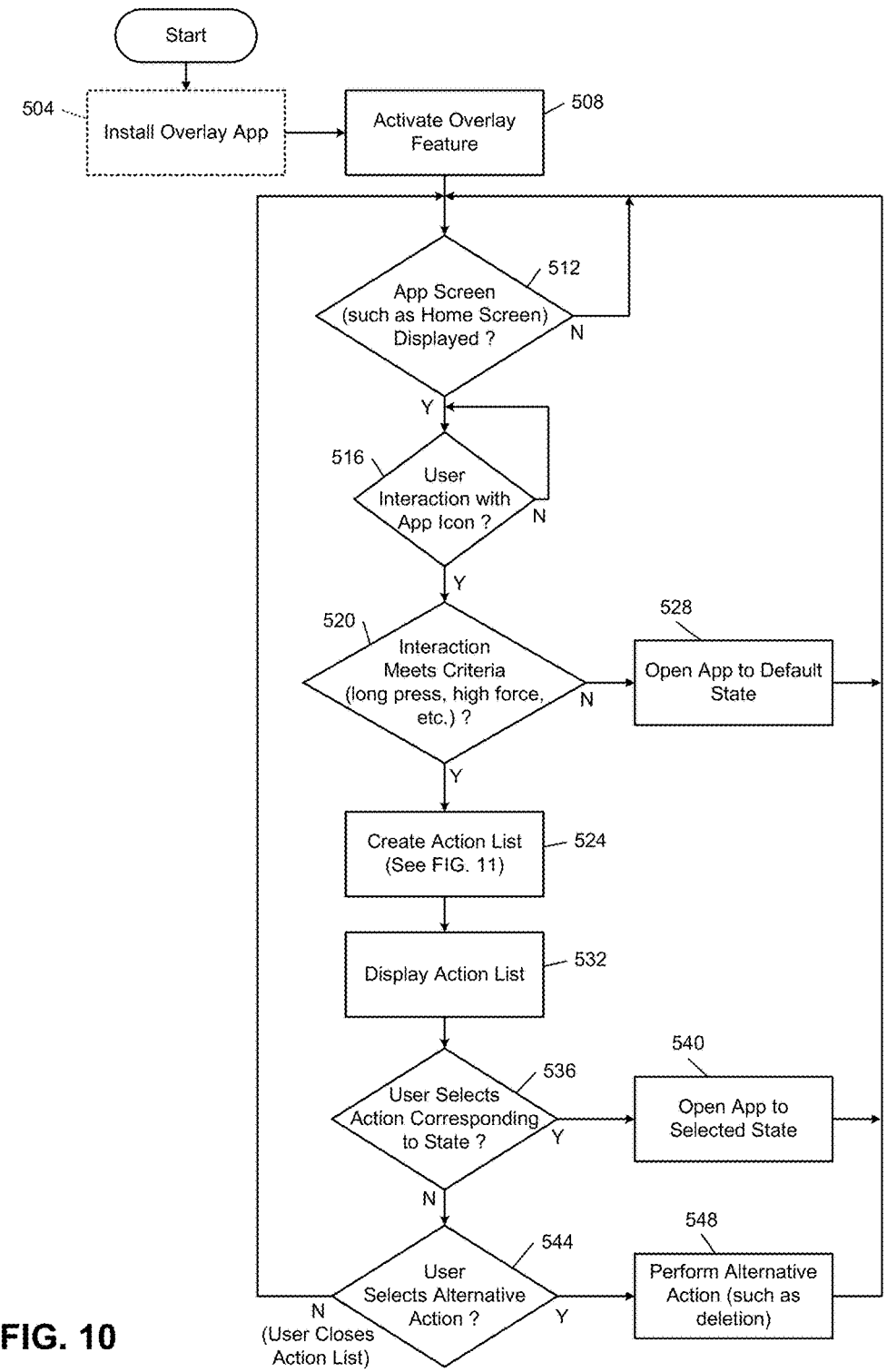
FIG. 10 is a flowchart of example operation of the overlay feature of an overlay app, skin, launcher, etc.

In FIG. 10, control begins at 504 upon installation of an overlay app. Element 504 is shown with a dashed line to indicate that the overlay app may already have been installed on the user device by a manufacturer of the phone or a wireless operator. Further, the overlay app may actually be part of the operating system itself. The overlay app may be a standard app downloadable from the digital distribution platform, but may have special privileges, such as the ability to draw over other apps (specifically, drawing over a home screen or launcher app). In other implementations, the overlay app may be part of the home screen or launcher app. For example, the overlay feature may be one of the features available to users of an alternative launcher app.

At 508, the overlay feature is activated. This activation may be via a setting in the overlay app or in the operating system. In other implementations, the overlay feature may be activated upon installation or first execution of the overlay app. At 512, control implemented by the overlay feature waits until an app screen is displayed. For example, the app screen may be a home screen in which icons corresponding to installed or available applications are displayed to the user. Commonly, these app icons are displayed in a grid format and may be grouped into folders that occupy some positions in the grid.

Control remains at 512 until the app screen is displayed, at which point control transfers to 516. At 516, control of the overlay feature waits until user interaction with one of the app icons is detected. Control then transfers to 520. At 520, control determines whether the user interaction meets certain criteria. If so, control transfers to 524; otherwise, control transfers to 528.

The criteria may include a length of time of a user's contact with a touchscreen or the force with which the user contacted the touchscreen. Other criteria may be the number of fingers (or other contact points) applied by the user. For example only, the criteria may indicate that either or both of a long press (a tap that lasts more than a predetermined period such as 500 ms) or a high force (a detected force greater than a predetermined threshold) will cause a transition to 524. At 528, a standard app icon operation is performed. Often, the standard response to interacting (such as tapping) an app icon is to open the app, which may lead to a home state of the app (default state) or a last-used state of the app. Control then returns to wait at 512.

Figure 11:
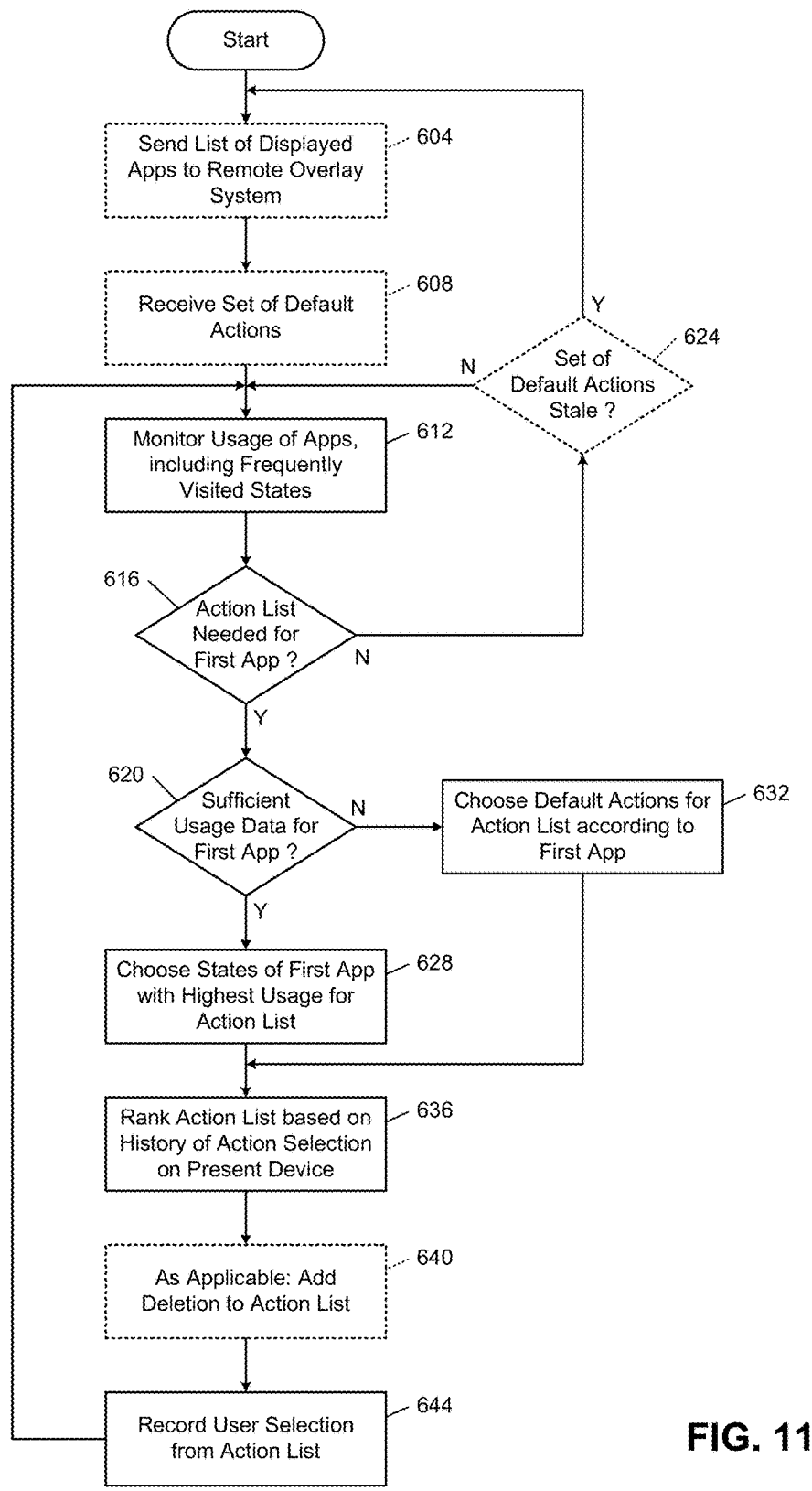
FIG. 11 is a flowchart of an example backend process for monitoring app usage and generating action lists.

At 524, control creates an action list corresponding to the app icon selected by the user. For example, the action was may be created as shown in FIG. 11. At 532, control displays the created action list. At 536, control determines whether the user selects an action corresponding to a state of the app. If so, control transfers to 540; otherwise, control transfers to 544. At 540, control opens the app to the selected state indicated by the selected entry in the action list. Control then returns to 512.

Opening the app to the selected state may be performed using an access mechanism, such as the view controller actuation or user interface replay. For more information on view controller actuation, see U.S. patent application Ser. No. 15/235,650, filed Aug. 12, 2016, titled "Monitoring And Actuation Of View Controller Parameters To Reach Deep States Without Manual Developer Intervention," with first named inventor Kalyan Desineni. For more information on user interface replay, see U.S. patent application Ser. No.

15/235,859, filed Aug. 12, 2016, titled "Deep Linking To Mobile Application States Through Programmatic Replay Of User Interface Events," with first named inventor Kalyan Desineni. The entire disclosures of the applications referenced above are incorporated by reference.

At 544, control determines whether the user selects an alternative action from the action list. If so, control transfers to 548; otherwise, such as if the user closes the action list (by tapping outside of the action list or selecting an icon, such as an "x", to close the list), control returns to wait at 512. At 548, control performs an alternative action, such as deletion. Control then returns to 512. In various implementations, a long press followed by a release may meet the criteria of 520. Meanwhile, a long press followed by a dragging motion toward the border of the screen may result in deletion. The deletion process may include at least one prompt to reduce the likelihood of unintended deletions.

In FIG. 11, control begins at 604, such as when the overlay app is installed. Control sends a request for action list items to a remote overlay system. The request includes a list of app, such as all apps presently visible on the current page of the home screen. Because a user device may have more installed apps than can fit on the screen at one time, the home screen (or launcher screen) may have multiple individual pages of app icons.

All potentially visible apps may be sent in the first request so that, when the user switches to another page of the home screen, network latency and network availability will not prevent action list items from being obtained for the newly displayed apps. In other implementations of 604, the request includes a list of all installed apps. In yet other implementations, the request will include apps visible on any of the pages of the home screen. In other words, apps accessible from a list of all apps (such as an app tray) but not placed on the home screen will not be sent.

At 608, control receives a set of default actions corresponding to each of the apps from the remote overlay system. The remote overlay system may provide the set of default actions based on aggregated and anonymized data from other use from other users. For example, the default actions may correspond to the most popular actions performed using the app. In some implementations, app developers may specify the default actions to the remote overlay system. Once the remote overlay system has acquired enough actual user data, the remote overlay system may override the default actions specified by the developer in favor of actions determined to be popular from empirical data.

At 612, control monitors usage of apps installed on the device, including noting and recording frequently visited states. At 616, control determines whether an action list is needed for a first app. If so, control transfers to 620; otherwise, control transfers to 624. The action list may be needed for the first app when a user interaction meeting the criteria of 520 of FIG. 10 is detected in relation to an icon for the first app.

At 624, control determines whether the set of default actions received from the remote overlay system is stale. If so, control returns to 604; otherwise, control continues at 612. The set of default actions may be considered stale if the amount of time since the list had been sent is greater than some predetermined threshold, such as 24 hours. The set of default actions may also be determined to be stale in response to installation of a new app since the last request for default actions was sent. Elements 604, 608, and 624 are shown with dashed lines to indicate that a remote overlay system may not be necessary. Instead, the overlay feature may simply base the action list on actual usage of apps on the device. This may result in few or no actions for the action list of apps that have been used infrequently.

At 620, control determines whether there is sufficient usage data for the first app. If so, control transfers to 628; otherwise, control transfers to 632. At 628, control chooses states of the first app with the highest recorded usage for placement on the action list. Control then continues at 636. At 632, control chooses default actions for the action list according to an identifier of the first app. These default actions may be those received from the remote overlay system at 608. In other implementations, default actions may be chosen by the overlay system even in the absence of user data by selecting states accessible from the home (or default) state of the first app. For example, if a restaurant app has prominently displayed links in the default state for "Restaurants near me" and for "Highest rated restaurants," the states corresponding to those links or user interface elements may be chosen as the default actions. Control then continues at 636.

At 636, control ranks the action list based on a history of user selection on the present device. In other words, if a user has previously selected a certain action, that action may be ranked first and displayed more prominently such as by being first in the action list. In other implementations, the ranking may be partially or entirely based on selection data aggregated by the remote overlay system. At 640, control adds an action of deletion to the action list. Element 640 may be omitted in implementations where, such as described above, deletion can be accomplished using a gesture that does not bring up the action list. At 644, control records which item from the action list is selected by the user. This data is stored and can be used in the future for ranking at 636. Control then returns to 612.

Further Details

A software application (i.e., a software resource) may refer to computer software that causes a computing device to perform a task. In some examples, a software application is referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 12:
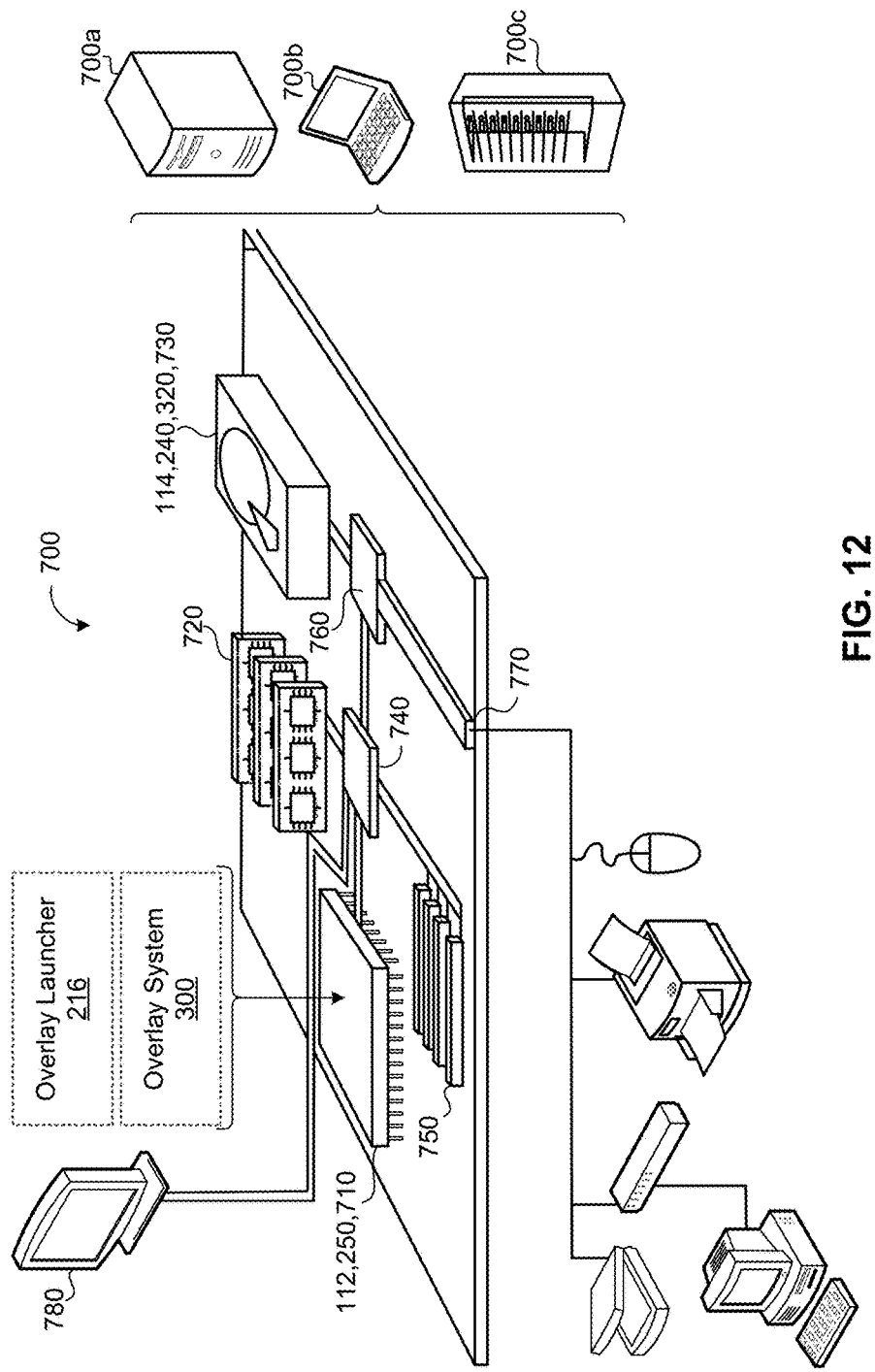
FIG. 12 is a schematic view of an example computing device executing any systems or methods described herein.

FIG. 12 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 112, 250, 710, memory 720, a storage device 114, 250, 320, 730, a high-speed interface/controller 740 connecting to the memory 720 and high-speed expansion ports 750, and a low speed interface/controller 760 connecting to low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 770. The low-speed expansion port 770, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method of operating a user device, the method comprising:
   in response to a set of app icons being displayed, where each of the set of app icons corresponds to a different app installed on the user device, monitoring for user interaction with one of the set of app icons;
   in response to detecting user interaction with a first app icon corresponding to a first app, determining whether the detected user interaction satisfies first criteria or second criteria;
   in response to determining that the detected user interaction satisfies the first criteria:
      preparing and displaying an action list corresponding to the first app, wherein the action list includes a set of action items for user selection, and wherein a first item of the set of action items corresponds to a specific state of the first app;
      monitoring for user interaction with the action list; and
      in response to determining user selection of the first item, opening the first app to the specific state; and
   in response to determining that the detected user interaction satisfies the second criteria, performing a default action for the first app, wherein:
   performing the default action for the first app includes launching the first app;
   the detected user interaction includes a press on a touchscreen of the user device at a location corresponding to the first app icon;
   the first criteria includes a length of the press exceeding a predetermined time threshold;
   the method further includes downloading a default set of action items for each of a plurality of apps from a remote overlay server via a network connection;
   the plurality of apps includes the first app;
   the plurality of apps includes apps corresponding to each of the set of displayed app icons;
   the method further includes downloading an access mechanism for the specific state of the first app from the remote overlay server via the network connection; and
   the access mechanism includes at least one of (i) a web access mechanism, (ii) an application download mechanism, and (iii) a native application access mechanism.

2. The method of claim 1 further comprising:
   in response to detecting user interaction with the first app icon, determining whether the detected user interaction satisfies third criteria; and
   in response to determining that the detected user interaction satisfies the third criteria, performing a deletion process for the first app.

3. The method of claim 1 further comprising:
   tracking usage of the first app; and
   generating the set of action items based on most frequently used states of the first app.

4. The method of claim 1 wherein opening the first app to the specific state includes at least one of:
   invoking a view controller corresponding to the specific state;
   providing a uniform resource identifier to the first app that indicates the specific state; and
   replaying user interface events corresponding to the specific state.

5. A user device comprising:
   data processing hardware; and
   memory hardware in communication with the data processing hardware, wherein the memory hardware stores instructions that, when executed on the data processing hardware, cause the data processing hardware to perform operations including:
      in response to a set of app icons being displayed, where each of the set of app icons corresponds to a different app installed on the user device, monitoring for user interaction with one of the set of app icons;
      in response to detecting user interaction with a first app icon corresponding to a first app, determining whether the detected user interaction satisfies first criteria or second criteria;
      in response to determining that the detected user interaction satisfies the first criteria:
         preparing and displaying an action list corresponding to the first app, wherein the action list includes a set of action items for user selection, and wherein a first item of the set of action items corresponds to a specific state of the first app;
         monitoring for user interaction with the action list; and
         in response to determining user selection of the first item, opening the first app to the specific state; and
      in response to determining that the detected user interaction satisfies the second criteria, performing a default action for the first app wherein:
      performing the default action for the first app includes launching the first app;
      the detected user interaction includes a press on a touchscreen of the user device at a location corresponding to the first app icon; and
      the first criteria includes a length of the press exceeding a predetermined time threshold;
   downloading a default set of action items for each of a plurality of apps from a remote overlay server via a network connection, wherein the plurality of apps includes the first app and wherein the plurality of apps includes apps corresponding to each of the set of displayed app icons; and
   downloading an access mechanism for the specific state of the first app from the remote overlay server via the network connection, wherein the access mechanism includes at least one of (i) a web access mechanism, (ii) an application download mechanism, and (iii) a native application access mechanism.

6. The user device of claim 5 wherein the operations further comprise:
   in response to detecting user interaction with the first app icon, determining whether the detected user interaction satisfies third criteria; and
   in response to determining that the detected user interaction satisfies the third criteria, performing a deletion process for the first app.

7. The user device of claim 5 wherein the operations further comprise:
   tracking usage of the first app; and
   generating the set of action items based on most frequently used states of the first app.

8. The user device of claim 5 wherein opening the first app to the specific state includes at least one of:
   invoking a view controller corresponding to the specific state;
   providing a uniform resource identifier to the first app that indicates the specific state; and
   replaying user interface events corresponding to the specific state.

9. A method of operating a user device, the method comprising:
   in response to a set of app icons being displayed, where each of the set of app icons corresponds to a different app installed on the user device, monitoring for user interaction with one of the set of app icons;
   in response to detecting user interaction with a first app icon corresponding to a first app, determining whether the detected user interaction satisfies first criteria or second criteria;
   in response to determining that the detected user interaction satisfies the first criteria:
      preparing and displaying an action list corresponding to the first app, wherein the action list includes a set of action items for user selection, and wherein a first item of the set of action items corresponds to a specific state of the first app;
      monitoring for user interaction with the action list; and
      in response to determining user selection of the first item, opening the first app to the specific state; and
   in response to determining that the detected user interaction satisfies the second criteria, performing a default action for the first app, wherein:
   performing the default action for the first app includes launching the first app;
   the detected user interaction includes a press on a touchscreen of the user device at a location corresponding to the first app icon;
   the first criteria includes a force of the press exceeding a predetermined force threshold;
   the method further includes downloading a default set of action items for each of a plurality of apps from a remote overlay server via a network connection;
   the plurality of apps includes the first app;
   the plurality of apps includes apps corresponding to each of the set of displayed app icons;
   the method further includes downloading an access mechanism for the specific state of the first app from the remote overlay server via the network connection; and
   the access mechanism includes at least one of (i) a web access mechanism, (ii) an application download mechanism, and (iii) a native application access mechanism.

10. The method of claim 9 further comprising:
    in response to detecting user interaction with the first app icon, determining whether the detected user interaction satisfies third criteria; and
    in response to determining that the detected user interaction satisfies the third criteria, performing a deletion process for the first app.

11. The method of claim 9 further comprising:
    tracking usage of the first app; and
    generating the set of action items based on most frequently used states of the first app.

12. The method of claim 9 wherein opening the first app to the specific state includes at least one of:
    invoking a view controller corresponding to the specific state;
    providing a uniform resource identifier to the first app that indicates the specific state; and
    replaying user interface events corresponding to the specific state.

13. A user device comprising:
    data processing hardware; and
    memory hardware in communication with the data processing hardware, wherein the memory hardware stores instructions that, when executed on the data processing hardware, cause the data processing hardware to perform operations including:
       in response to a set of app icons being displayed, where each of the set of app icons corresponds to a different app installed on the user device, monitoring for user interaction with one of the set of app icons;
       in response to detecting user interaction with a first app icon corresponding to a first app, determining whether the detected user interaction satisfies first criteria or second criteria;
       in response to determining that the detected user interaction satisfies the first criteria:
          preparing and displaying an action list corresponding to the first app, wherein the action list includes a set of action items for user selection, and wherein a first item of the set of action items corresponds to a specific state of the first app;
          monitoring for user interaction with the action list; and
          in response to determining user selection of the first item, opening the first app to the specific state; and
       in response to determining that the detected user interaction satisfies the second criteria, performing a default action for the first app, wherein:
       performing the default action for the first app includes launching the first app;
       the detected user interaction includes a press on a touchscreen of the user device at a location corresponding to the first app icon; and
       the first criteria includes a force of the press exceeding a predetermined force threshold;
    downloading a default set of action items for each of a plurality of apps from a remote overlay server via a network connection, wherein the plurality of apps includes the first app and wherein the plurality of apps includes apps corresponding to each of the set of displayed app icons; and
    downloading an access mechanism for the specific state of the first app from the remote overlay server via the network connection, wherein the access mechanism includes at least one of (i) a web access mechanism, (ii) an application download mechanism, and (iii) a native application access mechanism.

14. The user device of claim 13 wherein the operations further comprise:
- in response to detecting user interaction with the first app icon, determining whether the detected user interaction satisfies third criteria; and
- in response to determining that the detected user interaction satisfies the third criteria, performing a deletion process for the first app.

15. The user device of claim 13 wherein the operations further comprise:
- tracking usage of the first app; and
- generating the set of action items based on most frequently used states of the first app.

16. The user device of claim 13 wherein opening the first app to the specific state includes at least one of:
- invoking a view controller corresponding to the specific state;
- providing a uniform resource identifier to the first app that indicates the specific state; and
- replaying user interface events corresponding to the specific state.

* * * * *